(12) United States Patent
Nelson

(10) Patent No.: US 11,919,143 B2
(45) Date of Patent: Mar. 5, 2024

(54) SYSTEM AND METHOD FOR HAND TOOL WITH QUICK RELEASE INTERCHANGEABLE WORK HEADS

(71) Applicant: Barry D. Nelson, Phoenix, AZ (US)

(72) Inventor: Barry D. Nelson, Phoenix, AZ (US)

( * ) Notice: Subject to any disclaimer, the term of this patent is extended or adjusted under 35 U.S.C. 154(b) by 1231 days.

(21) Appl. No.: 16/442,194

(22) Filed: Jun. 14, 2019

(65) Prior Publication Data
US 2020/0391371 A1 Dec. 17, 2020

(51) Int. Cl.
*B25G 3/24* (2006.01)
*A01B 1/22* (2006.01)
*A46B 5/00* (2006.01)
*A01B 1/02* (2006.01)
*A01B 1/08* (2006.01)
*A01D 11/04* (2006.01)
(Continued)

(52) U.S. Cl.
CPC ............... *B25G 3/24* (2013.01); *A01B 1/227* (2013.01); *A46B 5/0095* (2013.01); *A01B 1/02* (2013.01); *A01B 1/08* (2013.01); *A01D 11/04* (2013.01); *B25D 7/00* (2013.01); *B26B 23/00* (2013.01); *Y10T 279/17846* (2015.01); *Y10T 279/17923* (2015.01)

(58) Field of Classification Search
CPC .... Y10T 279/17846; Y10T 279/17923; B25G 3/24; A01B 1/227; A46B 5/0095
See application file for complete search history.

(56) References Cited

U.S. PATENT DOCUMENTS

| | | | |
|---|---|---|---|
| 1,155,233 A | * | 9/1915 | Hammond .............. F16B 39/32 |
| | | | 279/97 |
| 1,530,225 A | | 1/1924 | Belakoy |
| 3,240,519 A | | 3/1966 | Weasler |

(Continued)

FOREIGN PATENT DOCUMENTS

JP        2549592        10/1996

OTHER PUBLICATIONS

PCT International Search Report for International Application PCT/US2019/068745, search report dated Jul. 13, 2020 (Jul. 13, 2020).

*Primary Examiner* — Eric A. Gates
*Assistant Examiner* — Reinaldo A Vargas Del Rio
(74) *Attorney, Agent, or Firm* — Daniel W. Roberts; Law Offices of Daniel W. Roberts, LLC

(57) ABSTRACT

Provided is a system and method for a hand tool with a plurality of quick release work heads. The hand tool includes a handle having a socket having a first longitudinal axis and an inner cavity extending rearward from an open distal end, the inner cavity having a first non-circular cross section transverse to the first longitudinal axis, the socket further having a quick release transverse to the first longitudinal axis, the quick release releasably disposing a locker transversely across a portion of the inner cavity. The hand tool also includes at least one work head having a second longitudinal axis and a shaft having a second non-circular cross section concentrically conforming to the first non-circular cross section of the inner cavity, the shaft further having a locking groove transverse to the second longitudinal axis and disposed to engage with the quick release locker when the shaft is disposed within the socket of the handle. An associated method of use is also provided.

35 Claims, 10 Drawing Sheets

(51) Int. Cl.
  *B25D 7/00* (2006.01)
  *B26B 23/00* (2006.01)

(56) References Cited

U.S. PATENT DOCUMENTS

| | | | |
|---|---|---|---|
| 4,162,132 | A | 7/1979 | Kress et al. |
| 4,406,559 | A | 9/1983 | Geertsema |
| 4,446,377 | A | 8/1984 | Kolb et al. |
| 4,565,398 | A | 1/1986 | Poulin |
| 4,645,368 | A * | 2/1987 | Simpson ............... F16D 1/116 403/324 |
| 4,645,369 | A | 2/1987 | Simpson |
| 5,579,848 | A | 12/1996 | Hsu |
| 5,695,229 | A | 12/1997 | Chang |
| 5,743,580 | A | 4/1998 | Evans |
| 5,788,299 | A | 8/1998 | Wilkinson |
| 5,810,408 | A | 9/1998 | Armstrong |
| 5,816,633 | A * | 10/1998 | Odom ............... A01B 1/227 294/51 |
| 6,435,059 | B1 * | 8/2002 | Martinez ............... B25D 1/06 81/20 |
| 6,585,444 | B1 | 7/2003 | Podbutzky |
| 8,220,852 | B2 | 7/2012 | Fenstemaker |
| 8,297,670 | B2 * | 10/2012 | Boies ............... A01D 9/00 294/49 |
| 8,408,161 | B2 * | 4/2013 | Lin ............... A46B 5/0095 15/176.1 |
| 2007/0044599 | A1 * | 3/2007 | Hsieh ............... B25G 3/28 81/177.85 |
| 2010/0186559 | A1 | 7/2010 | Pell |
| 2010/0269648 | A1 | 10/2010 | Fenstemaker |
| 2018/0272389 | A1 * | 9/2018 | Sheldon ............... A46B 11/06 |

\* cited by examiner

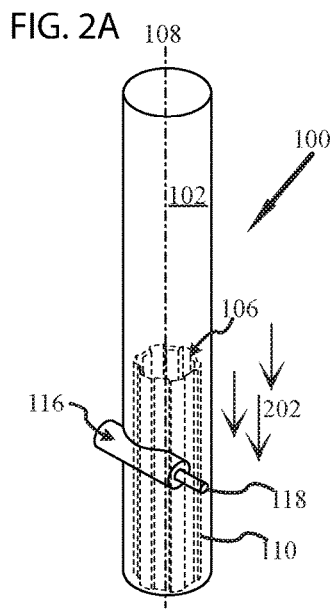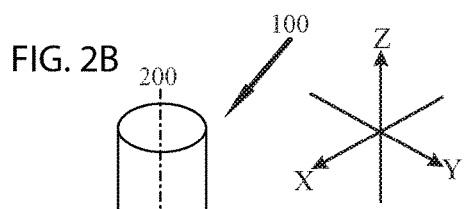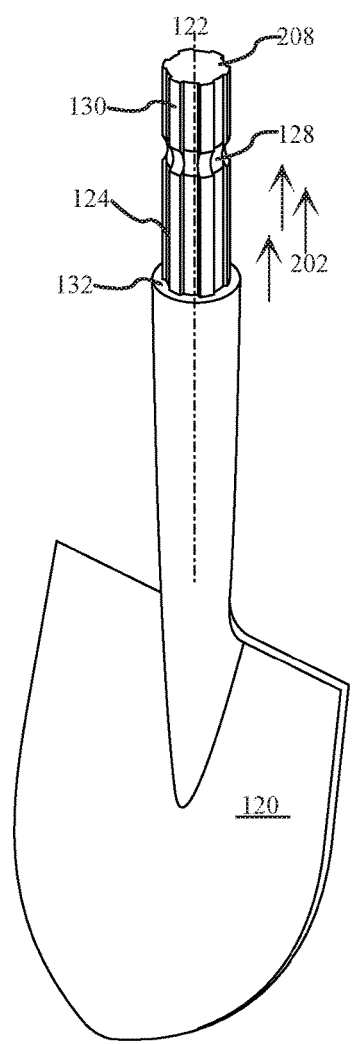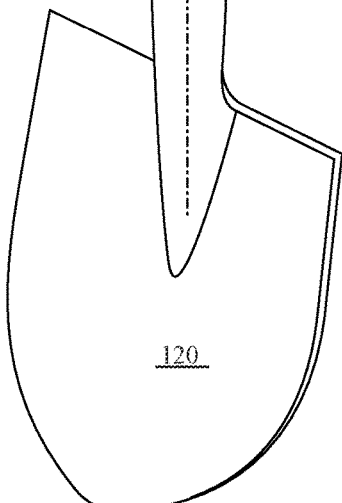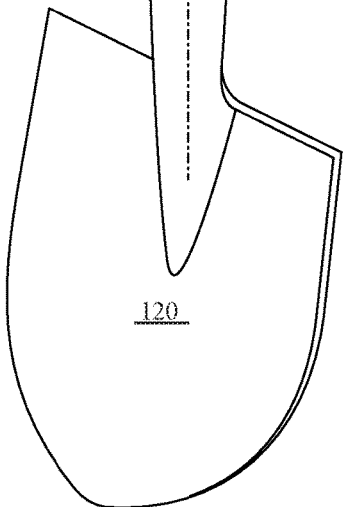

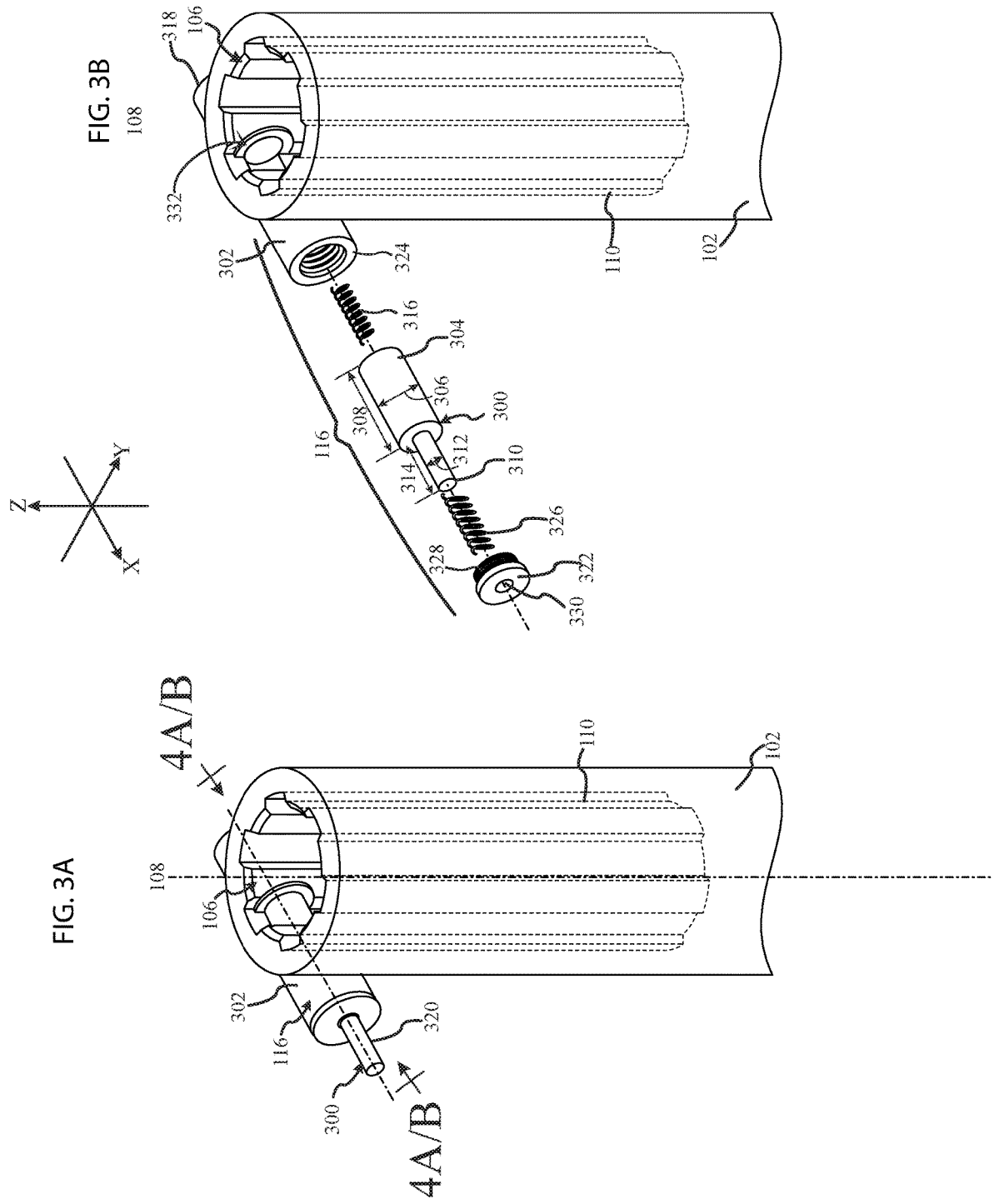

SYSTEM AND METHOD FOR HAND TOOL WITH QUICK RELEASE INTERCHANGEABLE WORK HEADS

FIELD OF THE INVENTION

The present invention relates generally to the field of hand tools typically for working the ground, such as a shovel, hoe, digging pic, or the like, and more specifically a handle with a plurality of interchangeable work heads which may be quickly and easily engaged and released, and when engaged with the handle are resistant to rotation in relation to the handle.

BACKGROUND

Hand tools for digging and working the ground, such as shovels, hoes, digging pics and the like are generally well known. Hand tools are also commonly found in the form of picks, axes and hammers such as sledge hammers. Indeed construction, yard and maintenance tools typically span the activities of digging, pounding, chopping, pushing, prying and leveraging. Moreover, as these tools are often plunged into the ground, or rocked back and forth once set into the ground, or driven into a material to break it or chop it, such tools must be sturdy and able to withstand impact and torsion force.

So as to achieve long lasting service many hand tools are constructed with high quality materials, especially with respect to the handles—but in general each tool has it's own work head and handle. More specifically, traditionally whether digging, pounding, chopping, pushing, prying and leveraging—the strongest and most long lasting such hand tools are generally provided with the handle and the tool head as an inseparable unit.

Different hand tools are applicable for different tasks, so it is not uncommon for a person—whether a professional in the construction or landscaping industry, or a homeowner—to have a plurality of different tools—such as, but not limited to a round headed shovel, a square headed shovel, a hoe, a pitch fork, a rake, etc. . . . . For those who work with such tools as part of their profession, the necessity to have a plurality of such tools often imposes several hardships.

First, given the nature of these tools and the desire for quality handles so as to be long lasting, such tools are often expensive. In addition, as each tool has its own attached handle, the transportation and storage of multiple hand tools can be burdensome. Further, when piled together, such as is often the case in the back of a pickup truck, or storage shed, the tools may become somewhat intertwined, and catch on one another.

Even for the home owner, storage and costs are an issue. Indeed, many hardware retailers sell specific racks which are to be wall mounted so that a tool owner can space out and hang his or her tools so as to neatly separate, see and find them. While helpful to a point, such systems require the user to dedicate a significant amount of wall space to such storage.

As such tools are forced into the ground and often shaken back and forth so as to loosen the ground, soil, rock or other material—it is not uncommon for the handle to become bent or broken, even though the work head itself may remain substantially undamaged and still potentially useful.

As handles are typically bonded, welded, or otherwise very permanently attached to the work head, the value of a still usable work head is essentially lost simply because the handle has failed. Although some replacement handles are available, often such replacements are not direct replacements and the user must modify or otherwise customize the handle to make it fit with old work head.

Various options have been developed to provide multiple work heads with an interchangeable handle. For example, a very early example of a tool with interchangeable work heads is presented by U.S. Pat. No. 1,530,225 to Belakoy for Gardening Implement. Dating back to 1924, this patent teaches a screw socket on the work head and a screw on the handle. This is now a fairly common attachment mechanism for brooms and mops—but of course as the handle and head are joined by being screwed together, torsion during use can inadvertently release the work head.

U.S. Pat. No. 4,162,132 to Krees entitled Implements, presents a coupling sleeve on the handle and a coupling pin on each head. The locking member can comprise a transverse screw or sneak. Relying on screws, the elements of the locking member can become detached and lost, as well as likely fouled or jarred loose during use. In addition, the screw locking member disposes force against the pin of the work head so as to drive the pin against the opposing inner wall of the coupling sleeve, which imparts a tilt to the pin. This also requires that the engagement of the pin within the socket is not uniform about the longitudinal axis of the tool. This tilt as well as the binding by lateral force may subject the Krees device to failure under impact during normal tool use.

U.S. Pat. No. 4,565,389 to Poulin, entitled Multi-Purpose Compound Hand Tool, teaches a compound garden type or agricultural tool having a handle with a bifurcated coupling element 18 which is adapted to engage identical connecting member 20 from different tool implements. More specifically, the connecting member 20 is slid between the bifurcated coupling element 18 and held in place with a winged bolt 56. As the connecting member 20 is effectively a blade between to prongs—it may only be inserted in one of two ways—each 180 degrees relative to each other. Potentially useful for light duty tasks, the removal of the bolt presents an opportunity for loss, and subjects the device to possible loosening during active use and or impact.

U.S. Pat. No. 5,810,480 to Armstrong teaches an Ergonomically Efficient Tool which permits the user to establish bends in the handle and angles of the handle to the work head. The handle is joined to the work head by a joining mechanism by engaging proximal ends 20 of the handle and work head with a central bore 22 and a plurality of opposing ridges 24 which are engaged with one another by a nut and bolt combination. While permitting a variety of different angles between the relative parts, the Armstrong system had distinct parts—such as the nut and bolt, which must not be lost during a work head exchange, and is likely not strongly resistant to long term impact and torsion forces.

In addition, fasteners based on screw together elements can be challenging for left-handed members of society. So, the Belakoy, Krees, Poulin, and Armstrong references noted above, among many others not noted, may not be as desirable or easy to operate for left handed people as for right handed people.

Moreover, although attempts have been made to provide tool systems utilizing a handle with multiple work heads, each appears to have limitations that may be undesirable, such as, but not limited to limitations of alignment, the possibility of multiple loose or detachable parts to the locking mechanism, the exposure of the locking mechanism to accidental loosening during use, and the likely inability of the various locking mechanisms to withstand impacts over a long term tool life.

Hence there is a need for a method and system that is capable of providing a hand tool with quick release interchangeable work heads while overcoming the above identified challenges and or limitations.

SUMMARY

This invention solves the problems of the prior art by providing novel systems and methods for providing a hand tool with quick release interchangeable work heads.

In particular, and by way of example only, according to one embodiment of the present invention, provided is a hand tool with quick release interchangeable work heads, including: a handle having a socket having a first longitudinal axis and an inner cavity extending rearward from an open distal end, the inner cavity having a first non-circular cross section transverse to the first longitudinal axis, the socket further having a quick release transverse to the first longitudinal axis, the quick release releasably disposing a locker transversely across a portion of the inner cavity; and at least one work head having a second longitudinal axis and a shaft having a second non-circular cross section concentrically conforming to the first non-circular cross section of the inner cavity, the shaft further having a locking groove transverse to the second longitudinal axis and disposed to engage with the quick release locker when the shaft is disposed within the socket of the handle.

In yet another embodiment, provided is a hand tool with quick release interchangeable work heads, including: a work head receiver as a component of a handle, the work head receiver having a first longitudinal axis and an inner cavity extending rearward from an open distal end, the inner cavity structured and arranged as a spline shaft socket, the work head receiver further having a quick release transverse to the first longitudinal axis, the quick release releasably disposing a locker transversely across a portion of the inner cavity; and at least one work head having a second longitudinal axis and a spline shaft concentrically conforming to the spline shat socket of the work head receiver, the spline shaft further having a locking groove transverse to the second longitudinal axis and disposed to engage with the quick release locker when the shaft is disposed within the work head receiver.

For yet another embodiment, provided is a hand tool for use with quick release interchangeable work heads, including: a work head receiver structured and arranged for attachment to a handle, the work head receiver having a first longitudinal axis and an inner cavity extending rearward from an open distal end, the inner cavity having a first polygonal cross section transverse to the longitudinal axis, the work head receiver further having a quick release transverse to the first longitudinal axis, the quick release releasably disposing a locker transversely across a portion of the inner cavity; and wherein the handle is structured and arranged to receive at least one work head having a second longitudinal axis and a shaft having a second polygonal cross section concentrically conforming to the first polygonal cross section of the inner cavity, the shaft further having a locking groove transverse to the second longitudinal axis and disposed to engage with the quick release locker when the shaft is disposed within the socket of the work head receiver.

And, for yet still another embodiment, provided is a hand tool interchangeable work head for use with a with quick release receiver, including: a work head having a first longitudinal axis and a shaft having a first polygonal cross section, the shaft further having a locking groove transverse to the first longitudinal axis, the work head structed and arranged to be received by a handle having a socket having a second longitudinal axis and an inner cavity extending rearward from an open distal end, the inner cavity having a second polygonal cross section transverse to the second longitudinal axis and concentrically conforming to the first polygonal cross section of the shaft, the socket further having a quick release transverse to the first longitudinal axis, the quick release releasably disposing a locker transversely across a portion of the inner cavity; and wherein the locking groove is structured and arranged to engage with a quick release locker when the shaft is disposed within a socket of a handle.

And still, for yet one other embodiment, provided is a method of providing a hand tool with quick release interchangeable work heads, including: providing a handle having a socket having a first longitudinal axis and an inner cavity extending rearward from an open distal end, the inner cavity having a first non-circular cross section transverse to the longitudinal axis, the socket further having a quick release transverse to the first longitudinal axis, the quick release releasably disposing a locker transversely across a portion of the inner cavity; providing at least one work head having a second longitudinal axis and a shaft having a second non-circular cross section concentrically conforming to the first non-circular cross section of the inner cavity, the shaft further having a locking groove transverse to the second longitudinal axis and disposed to engage with the quick release locker when the shaft is disposed within the socket of the handle; disposing the locker away from the inner cavity; slideably disposing the shaft of a selected work head from the at least one work head provided into the socket; and releasing the locker into the inner cavity so as to engage with the locking groove of the disposed work head.

BRIEF DESCRIPTION OF THE DRAWINGS

At least one system and method for a hand tool with quick release interchangeable work heads will be described, by way of example in the detailed description below with particular reference to the accompanying drawings in which like numerals refer to like elements, and:

FIGS. 2A, 2B and 2C show in perspective the progression of assembly for the hand tool in accordance with embodiments of the present invention;

FIGS. 3A and 3B are partial perspective views showing the socket for receiving a work head in accordance with embodiments of the present invention;

DETAILED DESCRIPTION

Before proceeding with the detailed description, it is to be appreciated that the present teaching is by way of example only, not by limitation. The concepts herein are not limited to use or application with a specific system or method for providing one or more hand tools incorporating a handle with a plurality of quick release interchangeable work heads. Thus, although the instrumentalities described herein are for the convenience of explanation shown and described with respect to exemplary embodiments, it will be understood and appreciated that the principles herein may be applied equally in other types of systems and methods of providing and using a hand tool with quick release interchangeable work heads.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., hand tool 100 appears in FIG. 1.

Figure 1:
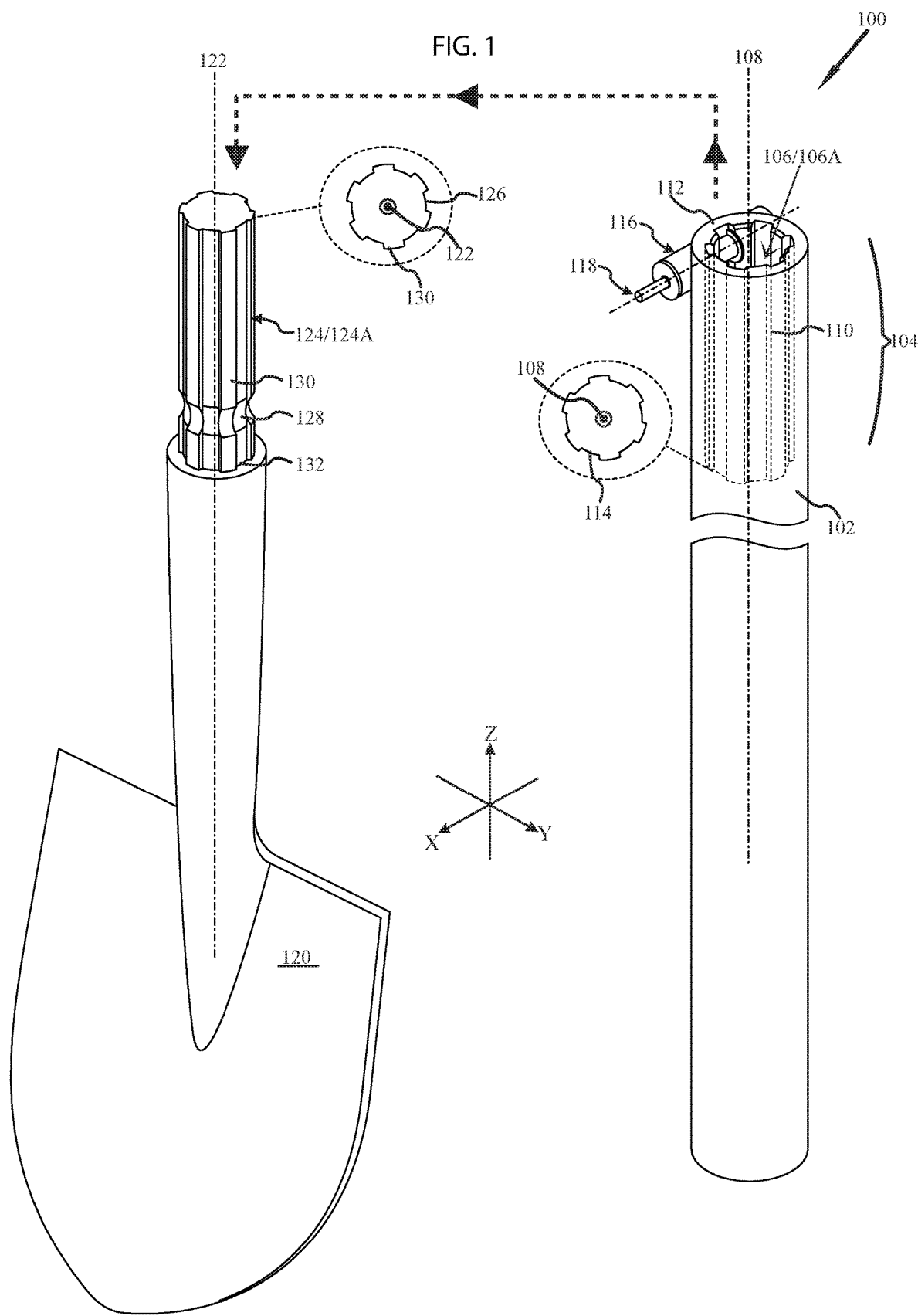
FIG. 1 is a perspective view of a hand tool provided by a handle with a work head receiver having quick release and a work head in accordance with embodiments of the present invention.

Turning now to the drawings, and more specifically FIG. 1, there is shown a hand tool 100 according to at least one embodiment. To facilitate the description of the hand tool 100, the orientations of the hand tool 100 as presented in the figures are referenced to a coordinate system with three axes orthogonal to each other as shown in FIG. 1.

These axes intersect mutually at the origin of the coordinate system, which is chosen to be the center of the hand tool 100, however the axis shown in all figures are offset from this center point of the hand tool 100 for ease and clarity of illustration. Moreover, FIG. 1 is a perspective view of an embodiment of hand tool 100 in accordance with the X, Y and Z-axis as shown.

As shown in FIG. 1, hand tool 100 is generally provided by a handle 102 with a work head receiver 104 with a quick release 116 that may be temporarily attached to at least one work head 120 (tool head), such as the shovel work head 120 shown. In varying embodiments, the work head receiver 104 may be a distinct element or an integrated component formed as part of the handle 102, or subsequently joined to the handle 102.

As will be appreciated from the following description and the accompanying illustrations, at least one embodiment of the hand tool 100 as provided by handle 102 and work head 120 may be quickly assembled or disassembled without loose parts being available to be dropped and lost which would frustrate the temporary locking mechanism, permits a range of alignment options, and is substantially impervious to impact force, rotational torsion, and leverage forces.

More specifically, as shown in FIG. 1, the handle 102 provides a socket 106 having a first longitudinal axis 108. The socket 106 provides an inner cavity 110 extending rearward from an open distal end 112. The inner cavity 108 has a first non-circular cross section 114 transverse to the first longitudinal axis 108. The socket 106 also has a quick release 116 that is transverse to the first longitudinal axis 108. As is further described below with respect to FIGS. 3A-4B, the quick release 116 releasably disposes a locker 118 transversely across a portion of the inner cavity 110. For at least one embodiment, the socket 106 with quick release 116 is understood and appreciated to be the work head receiver 104.

The work head 120 has a second longitudinal axis 122 and a shaft 124 having a second non-circular cross section 126. The shaft 124 also has a locking groove 128 transverse to the second longitudinal axis 122. Indeed, as shown in the FIGS. 1 and 2A-2C, for at least one embodiment the transverse locking groove 128 encircles the shaft 124. Moreover, for at least one embodiment, the locking groove 128 is circumferential about the shaft 124 and substantially normal to the second longitudinal axis 122. The locking groove 128 is further disposed to engage with the quick release 116 locker 118 when the shaft 124 of the work head 120 is disposed within the socket 106 of the handle 102. Indeed, the shaft 124 may be referred to as a quick release shaft.

For at least one embodiment, the first non-circular cross section 114 and the second non-circular cross section 126 are regular polygons. For yet another alternative embodiment, the shaft 124 is a spline shaft 124A and the socket 106 is a corresponding spline shaft receiving socket 106A—the corresponding second non-circular cross section 126 and first non-circular cross section 114 being the cross section of a spline shaft and the cross section of a spline shaft receiving socket.

It is further understood and appreciated that the first non-circular cross section 114 and the second non-circular cross section 126 are concentrically conforming. In other words, the first non-circular cross section 114 and the second non-circular cross section 126 are substantially the same with the second non-circular cross section 126 being slightly smaller in diameter so as to slideably fit within the first non-circular cross section 114.

It is also to be understood and appreciated that although a spline shaft has a circular core with radial flanges 130, as used herein the term "non-circular cross" section is defined to refer to a plane figure whose boundary consists of points, at least some of which are non-equidistant from a fixed point at the center, e.g., the longitudinal axis 108 or 122. In contrast, a circular cross section is understood to be a plane figure whose boundary consists of points equidistant from a fixed center point. Whether rectilinear, triangular or other shaped, the radial flanges 130 of a spline shaft define an outer edge boundary consisting of points, at least some of which are at different distances from a fixed point at the center, e.g., the longitudinal axis 108 or 122.

The assembly of the hand tool 100 is shown more completely in FIG. 2A-2C. Starting with FIG. 2A, as shown, the handle 102 is now disposed over the work head 120, such that the first longitudinal axis 108 and the second longitudinal axis 122 are now imposed upon each other as combined longitudinal axis 200, as shown in FIGS. 2B and 2C. In other words, for at least one embodiment, the first longitudinal axis 108 of the socket, and more specifically the inner cavity 110 and the second longitudinal axis 122 of the shaft of the work head 120 become one and the same when the work head 120 is engaged with the socket 106 to provide hand tool 100.

As shown in FIG. 2B, the shaft 124 and socket 106 are slideably engaged along the now combined longitudinal axis as represented by movement arrows 202. To facilitate the connection, the locker 118 of the quick release 116 has been disengaged, as indicated by arrow 204.

As shown in FIG. 2C, the shaft of the work head has been fully engaged with the socket 106. As shown in dotted relief, the locking groove 128 is now aligned with the quick release 116 and the locker 118 has been engaged. For at least one embodiment, as shown, the shaft 124 is entirely enclosed by the socket 106 such that it is protected from foreign debris during use.

Indeed, for at least one embodiment, an optional O-Ring or other compressible gasket 206 may be disposed about the shaft 124 (as shown in FIG. 2B, if not at least partially inset to either the work head 120 or distal end 112 of the handle 102 so as to provide a substantially liquid tight seal between the work head 120 and handle 102.

Moreover, as the shaft 124 of the work head 120 is engaged to the socket 106 of the handle 102, the slideable slip fit achieved by the slightly smaller size of second non-circular cross section 126 of the work head 120 permits ease of assembly as the motion is along the aligned longitudinal axis 200. In addition, as the first non-circular cross section 114 and second non-circular cross section 126 are concentric, the circumferential fit between the shaft 124 and the socket 106 is substantially uniform.

As such, impact forces, rotational torsion, and leverage forces during use are in general uniformly distributed throughout the engaged structure of the shaft 124 and the socket 106. More specifically, although certain digging or prying actions may temporarily concentrate forces more to one side of the assembly then another, the structure and arrangement of the interlocking shaft 124 and socket 106 does not attempt to concentrate such force.

Further, although these non-circular cross sections have been specifically selected to permit longitudinal sliding, the non-circular cross sections advantageously prohibit rotation of the work head 120 relative to the handle 102, and vis-a-versa about the longitudinal axis 200, once assembled.

To briefly summarize, for at least one embodiment, the present invention provides a hand tool 100 with quick release interchangeable work heads. This hand tool 100 is provided by the engaged elements of a handle 102 with an engaged work head 120. More specifically, the hand tool 100 has a handle 102 having a socket 106 having a first longitudinal axis 108 and an inner cavity 110 extending rearward from an open distal end 112, the inner cavity 110 having a first non-circular cross section 114 transverse to the first longitudinal axis, the socket further having a quick release transverse to the first longitudinal axis 108, the quick release 116 releasably disposing a locker 118 transversely across a portion of the inner cavity 110. The hand tool 100 is completed by at least one work head 120 having a second longitudinal axis 122 and a shaft 124 having a second non-circular cross section 126 concentricly conforming to the first non-circular cross section 114 of the inner cavity 110, the shaft 124 further having a locking groove 128 transverse to the second longitudinal axis 122 and disposed to engage with the quick release 116 locker 118 when the shaft 124 is disposed within the socket 106 of the handle 102.

Of course, it should also be understood and appreciated that in various embodiments, the present invention may be practiced with respect to the distinct parts—the handle 102 in one instance and the one or more work heads 120 in a second instance.

As With respect to FIGS. 1 and 2, it will be appreciated that in FIG. 1 the quick release has been illustrated as proximate to the open distal end 112, and the locking groove 128 has been shown correspondingly proximate to the base 132 of the shaft 124. For at least one optional embodiment, as shown in FIG. 2A-2C, the locking groove 128 is shown more proximate to the distal end 206 of the shaft 124, and the quick release 116 is correspondently moved up the outside of the socket 106. Moreover, although the relative location of the quick release 116 and locking groove 128 are intended to be consistent for a given embodiment of the hand tool 100, different locations may be employed for different embodiments of the hand tool 100 so as to perhaps ensure that work heads 120 from one embodiment are not inadvertently used with another—i.e., hand tool embodiments used with hazardous materials vs those used for gardening.

Turning to FIGS. 3A and 3B, an embodiment of the quick release 116 is presented in greater detail, assembled in FIG. 3A, and in an exploded view in FIG. 3B. Moreover, for at least one embodiment, the quick release 116 is a generally enclosed structure comprising a sliding pin 300 within a sleeve 302.

For at least one embodiment, the pin 300 has a first section 304 having a first diameter 306 consistent across a first length 308 and a second section 310 having a second diameter 312 consistent along a second length 314. As may be further appreciated from FIG. 3B, the second diameter 312 is smaller than the first diameter 306.

The pin 300 is disposed within a sleeve 302 with the first section 304 of the pin 300 against a spring 316 disposed against a first end 318 of the sleeve. At least a portion 320 of the second section 310 is disposed through a securing cap 322 affixed to a second end 324 of the sleeve opposite from the first end 318. For at least one embodiment, a second spring 326 may be disposed about the second section 310 between the securing cap 322 and the first section 304.

For at least one embodiment, the securing cap 322 is threaded such that it may be screwed into place with corresponding threads 328 provided by sleeve 302. In varying embodiments, securing cap 322 may be torqued into place so as to avoid unintentional loosening of securing cap 322. In addition, one or more flexible gaskets may be employed between the central bore 330 of securing cap 322 and the second section 310 of the pin 300, and/or between securing cap 322 and sleeve 302 so as to effectively provide a substantially sealed and liquid tight mechanism when the shaft 124 (not shown in FIG. 3A, 3B) is fully engaged in socket 106.

As may be appreciated in FIG. 3B, the sleeve 302 has a longitudinal aperture 332 opening to the inner cavity 110 of the socket 102.

Figures 4A, 4B:
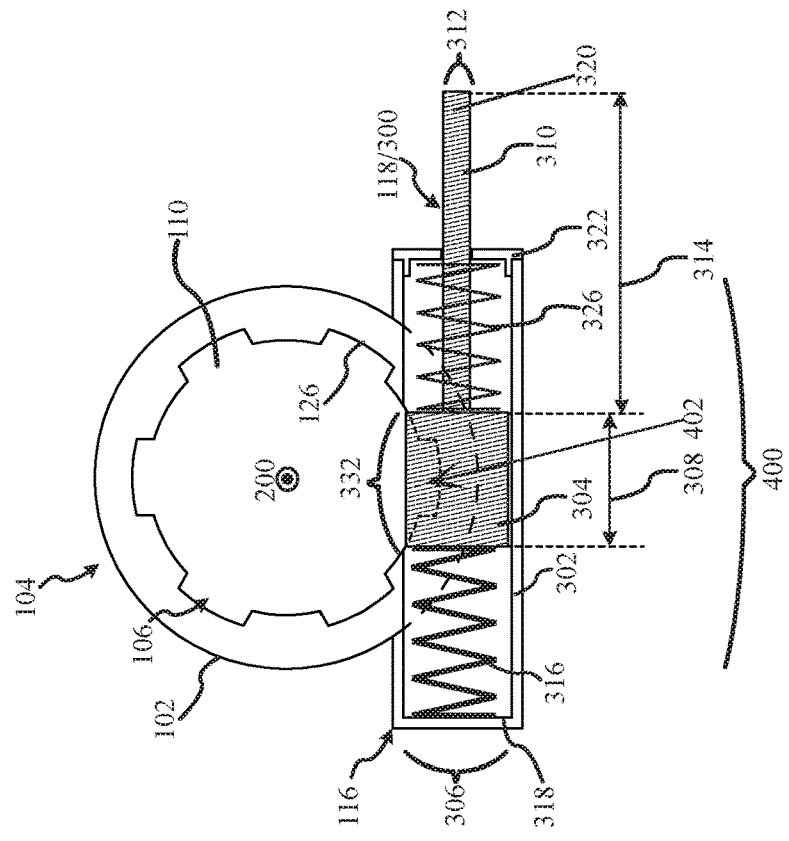
FIGS. 4A and 4B show partial cut through views identified in FIG. 3A showing the operation of the quick release of the hand tool in accordance with embodiments of the present invention.
Figure 5A:
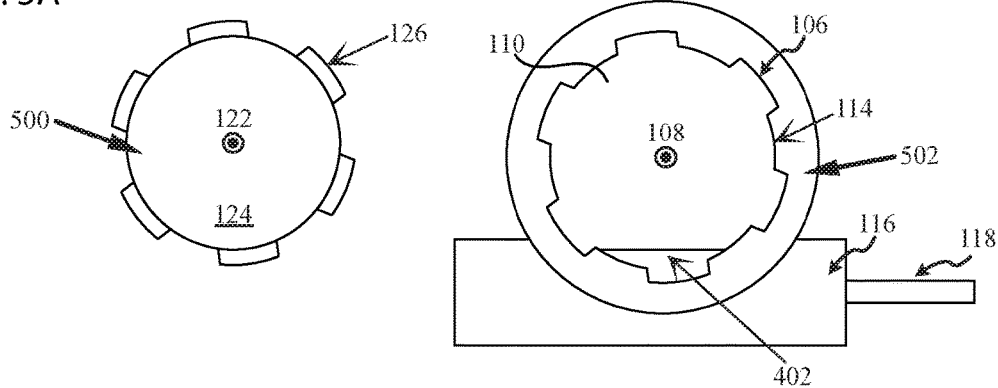
FIGS. 5A-5D show end views/non-circular cross sections of the shaft and socket for the hand tool in accordance with embodiments of the present invention.
Figure 5B:
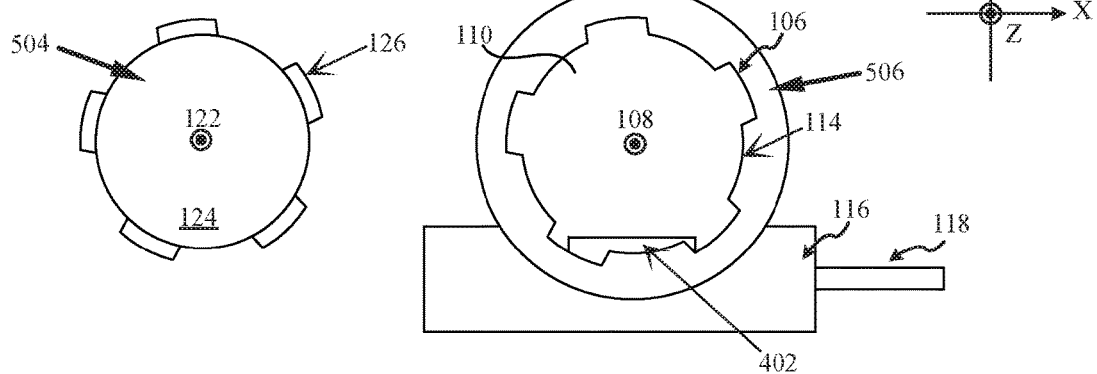
Figure 5C:
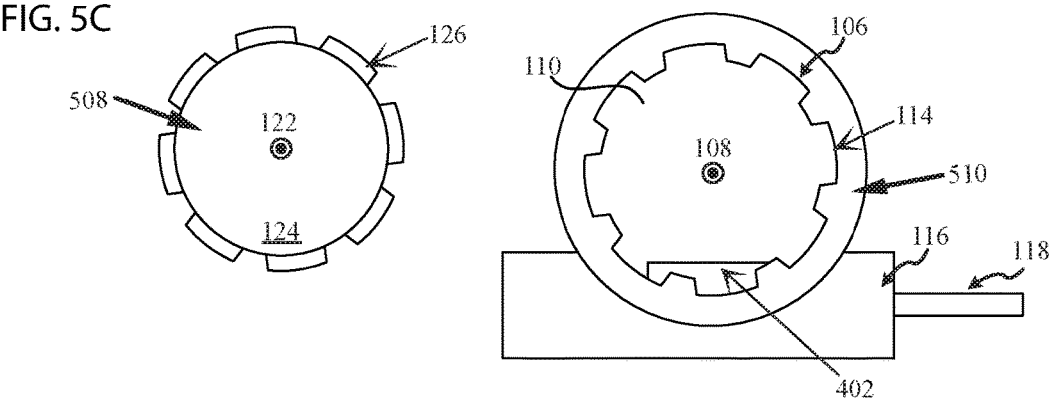
Figure 5D:
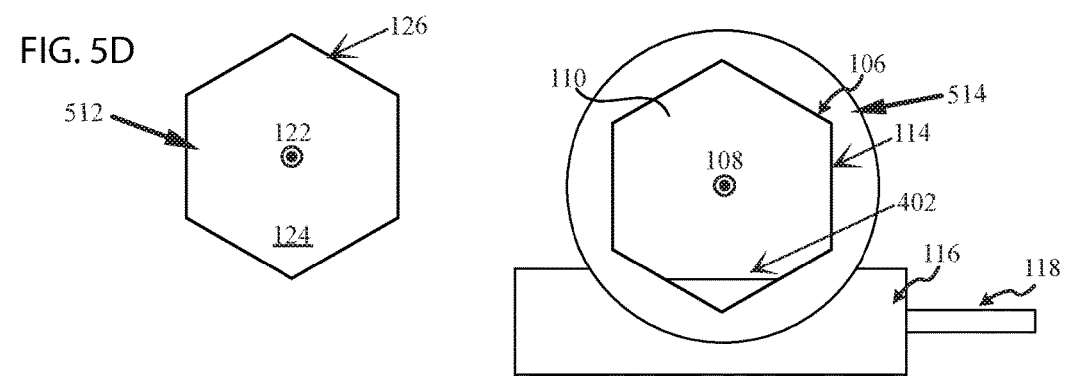

Operation of the quick release 116 in accordance with at least one embodiment may be further appreciated with respect to FIGS. 4A and 4B, depicting a cross sectional cut through view of the quick release 116.

More specifically, FIG. 4A presents a cross sectional view of the locker 118, and more specifically the pin 300 in a first state 400 (first position) where the first section 304 is aligned to longitudinal aperture in the sleeve 302 opening transversely to the inner cavity 110 such that a longitudinal portion 402 of the first section 304 of the pin 300 is disposed within the inner cavity. In this first position, with the longitudinal portion 402 so disposed, the longitudinal portion 402 of pin 300 will nest within a portion of the locking groove 128, and thus serve to lock the shaft 124 in place within the socket 106 (the shaft 124 and locking groove 128 not shown in FIGS. 4A and 4B for ease of illustration).

For at least one embodiment, the first state 400 is achieved by the first spring 316 and the second spring being specifically pre-selected so as to pre-position the first section 304 in the first state 400.

FIG. 4B presents a cross sectional view of the locker 118, and more specifically the pin 300 in a second state 404 (second position), where the first section 304 is displaced from the inner cavity 110. As shown, this second state 404 may be achieved by applying a force, indicated by force arrows 406, to push the second section 310 of the pin 300 inward, and thus drive the first section laterally away from the inner cavity 110 by compressing the first spring 316. In this second position 404, with the longitudinal portion 402 so disposed, the longitudinal portion 402 of pin 300 is removed from nesting within a portion of the locking groove 128 (see FIGS. 1 and 2A-2C), and/or otherwise blocking the insertion or removal of the shaft 124 from the socket 106.

In contrast to ball locking mechanism, as at least one embodiment of the present invention provides a longitudinal portion 402 of pin 300—effectively a section of a rod, the relative surface area of the longitudinal portion 402 in contact with the locking groove 128 may be substantially greater than the partial surface area of an optional ball element.

Moreover, the longitudinal section 402 of pin 300 may provide a more secure locking element, than the partial contact of a ball element. However, for at least one optional embodiment, at least one ball element is used in place of the first section 304 of the pin 300. The ball element (not shown) may be driven laterally out of the longitudinal aperture 322 by second section 310, and returned by first spring 316.

With respect especially to FIGS. 3A-4B it will be understood and appreciated that the quick release 116 is operable without disassembly. More specifically, as the quick release 116 operates without bolt, nut, wing nuts or other elements requiring physical removal and or threading and unthreading, quick release 116 advantageously eliminates the possibility that parts of the locking mechanism may be lost when the work head 120 is disengaged from the handle 102. In addition, use of the quick release 116 is not biased for right handed people over left handed people. For at least one embodiment, the orientation of the quick release 116 may be reversed during fabrication. However, it will also be appreciated that regardless of the orientation of the quick release 116 during fabrication, the locker may be oriented towards either a user's right or left by simply rotating the handle 102 about one-hundred and eighty degrees (180°).

Additionally, because the first non-circular cross section 114 and the second non-circular cross section 126 eliminate rotation of the work head 120 relative to the handle 102, and more specifically the socket 106, the quick release 116 is structured and arranged to prevent undesired longitudinal movement of the work head 120 relative to the handle 102, save for desired attachment or removal. By distinctly separating the elements preventing rotation and the elements preventing longitudinal motion the structural integrity of the hand tool 100 is significantly improved.

Further, as the locker 118 is essentially provided by a longitudinal section of a shaft nesting within a longitudinal section of a groove, hand tool 100 is highly impact resistant. This is due at least in part to the fact that impact forces along the longitudinal axis 200 of the hand tool 100 are transvers to the locker 118 and the locking groove 128. Indeed, the assembled hand tool 100 may be used for aggressive digging, levering, pounding, chopping, battering and other often desired heavy use activities.

Moreover, in sharp contrast to many prior efforts to provide optional work heads, embodiments of the present invention are advantageously readily applicable to hand tools desired for digging, pounding, chopping, pushing, prying and leveraging without specific modification for each, or at least some, of these possibly desired activities.

FIGS. 5A-5D presents various end section views of the socket 106 and shaft 124. The end view of the shafts 124 is substantially about the same as the second non-circular cross section 126. Indeed, as noted above, and now shown in greater detail, in varying embodiments, the first non-circular cross section 114 and the second non-circular cross section 126 are selected to be that of a spline shaft socket and a spline shaft.

In varying embodiments, the spline shaft may have between 2 and 36 splines. For at least one specific embodiment, the shaft 124 is a 6 splined shaft 500 and the socket 106 is a corresponding 6 splined shaft socket 502. For another specific embodiment, the shaft 124 is a 5 splined shaft 504 and the socket 106 is a corresponding 5 splined shaft socket 506. For at least one further alternative embodiment, the shaft 124 is an 8 splined shaft 508 and the socket 106 is a corresponding 8 splined shaft socket 510.

For still yet another embodiment, the first non-circular cross section 114 and the second non-circular cross section 126 are regular polygons. More specifically, for at least one embodiment, the first non-circular cross section 114 and the second non-circular cross section 126 are selected from the group consisting of, but not limited to, triangle, pentagon, hexagon, octagon, heptagon, and decagon. Moreover, for at least one specific embodiment, the shaft 124 is a pentagon shaft 512 and the socket 106 is a corresponding pentagon shaft socket 514.

It will be understood and appreciated that the use of regular polygons or spline shafts, permits attachment of the work head 120 and the handle 102 in a variety of different orientations. More specifically, a user is not limited to one precise alignment for engagement. For yet other embodiments, where the nature of the desired hand tool 100 may have a preferred alignment, the use of keyed a spline shaft or non-regular polygon may also be employed.

Figure 6:
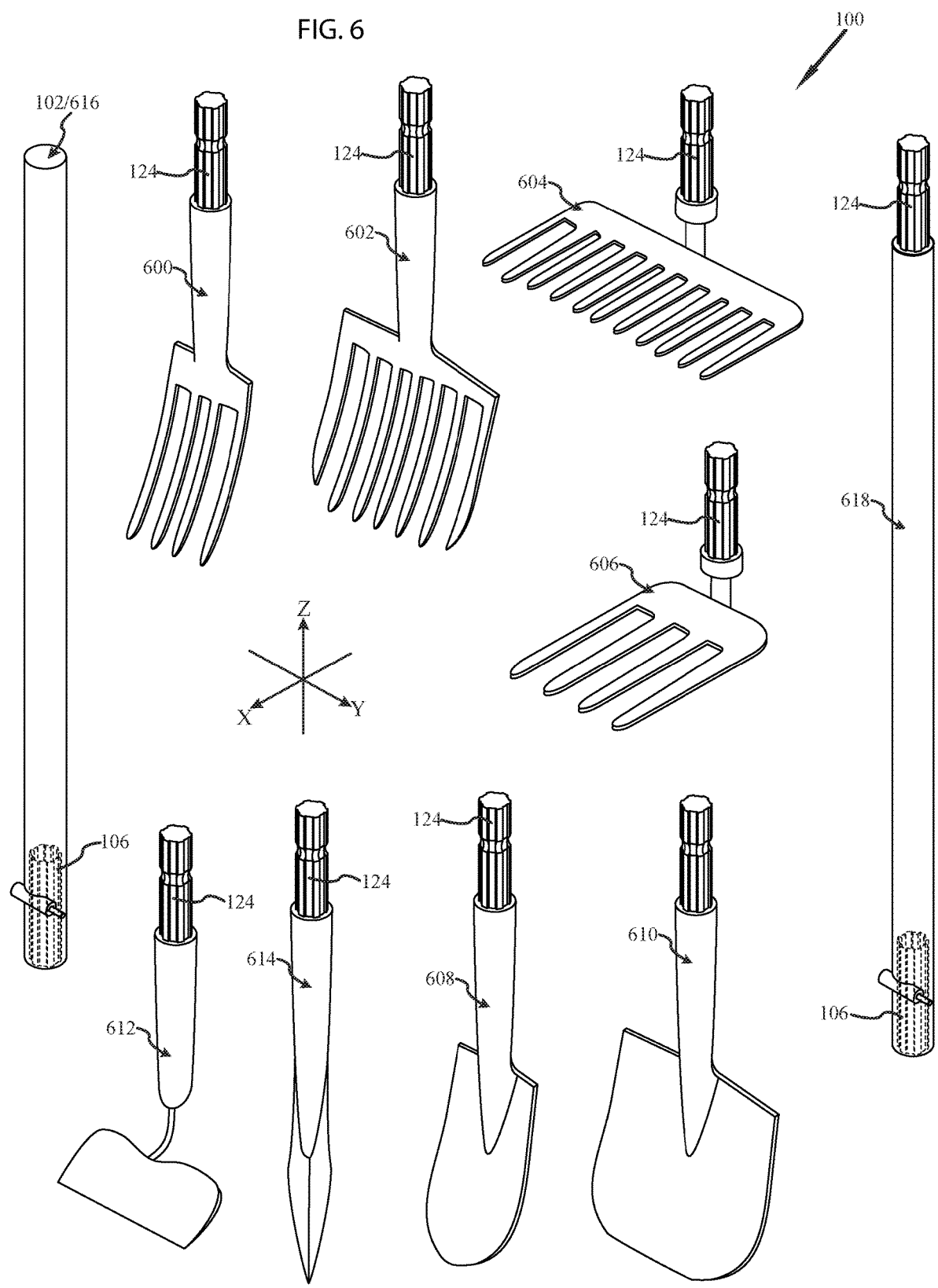
FIG. 6 shows a plurality of optional work heads, a long handle and handle extension for long handled hand tools in accordance with embodiments of the present invention.

Moreover, as shown in FIG. 6, for at least one embodiment, hand tool 100 may be provided such that handle 102 is may be optionally attached with a plurality of different work heads, such as pitch forks 600, 602, rakes 604 and 606, a round shovel 608, a square head, e.g., spade shovel 610, a hoe 612, digging spike 614 or other optional work head, not shown.

For the various embodiments of optional work heads shown in FIG. 6, it will be understood and appreciated that for such normal hand tools 100, the handle 102/616 is in most instances desired to be straight and long. For ease of illustration and discussion, the handle 102/616 has been shown as straight and long, however, it will be understood and appreciated that for at least one embodiment, the handle may be provided with one or more pre-established bends or angles.

Further, in light of the present description, it will be understood and appreciated that variations of the hand tool 100 may also include at least one additional handle 618 having the socket 106 at one end and a shaft 124 at the other, so as to permit extension of the handle. Additionally, two handles 102 may be employed with a post hole digging work head (not shown).

Figure 7:
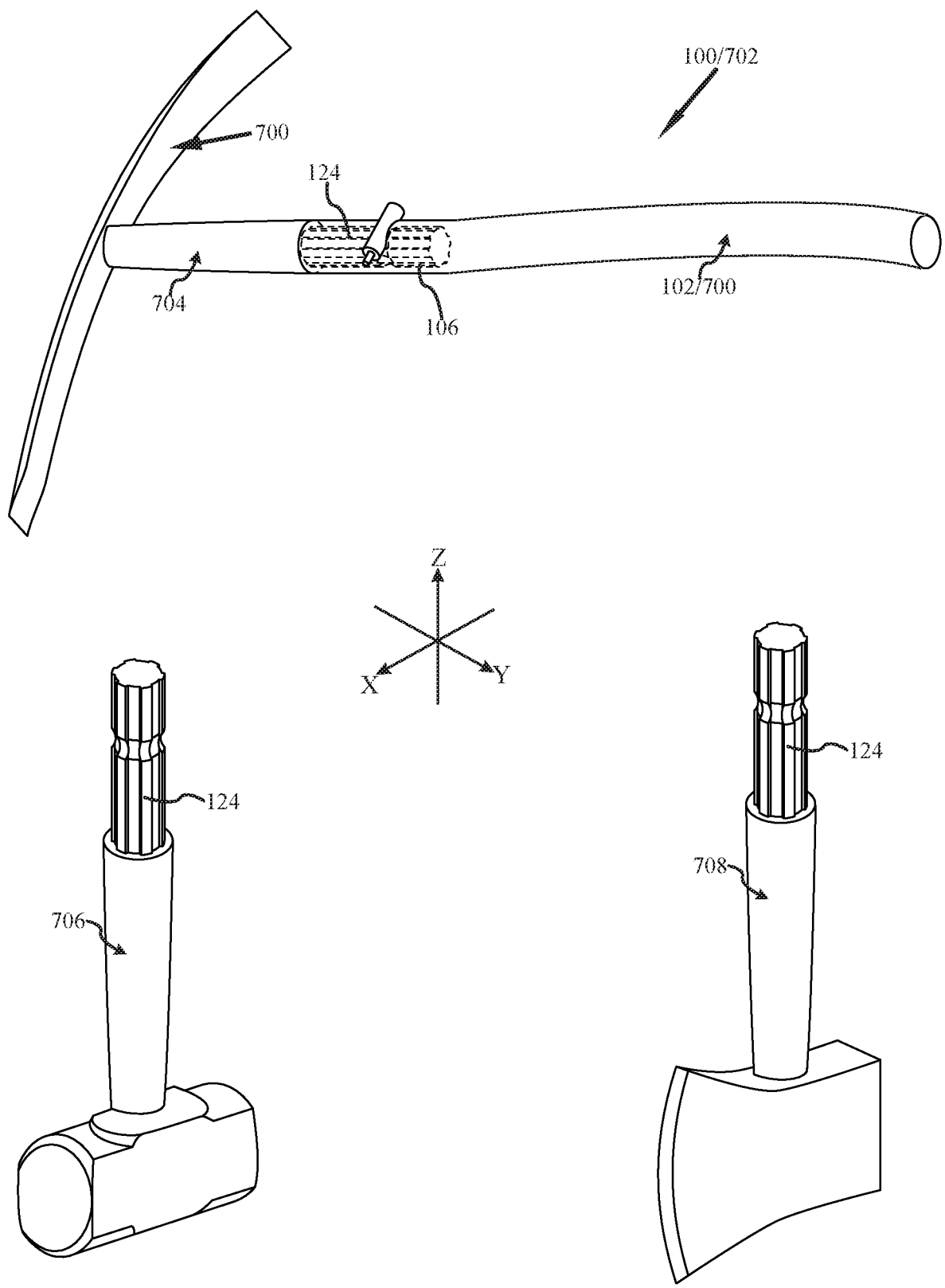
FIG. 7 shows a plurality of optional work heads, a short handle for short handled, chopping type hand tools in accordance with embodiments of the present invention.

In sharp contrast to other known quick connection tool systems, the robust nature of hand tool 100, and specifically the coupling properties of the socket 106 and shaft 124, in varying embodiments, hand tool 100 may be provided as a swinging hand tool, such as are shown in FIG. 7. Indeed, for at least one embodiment the handle 102/700 is short and may optionally be curved such that the hand tool 100 is operable as a pick 702 when handle 102/700 is coupled with a pick work head 704. Handle 102/700 may also be optionally coupled with a sledge hammer work head 706, an axe work head 708, or other swinging type work head.

Figure 8:
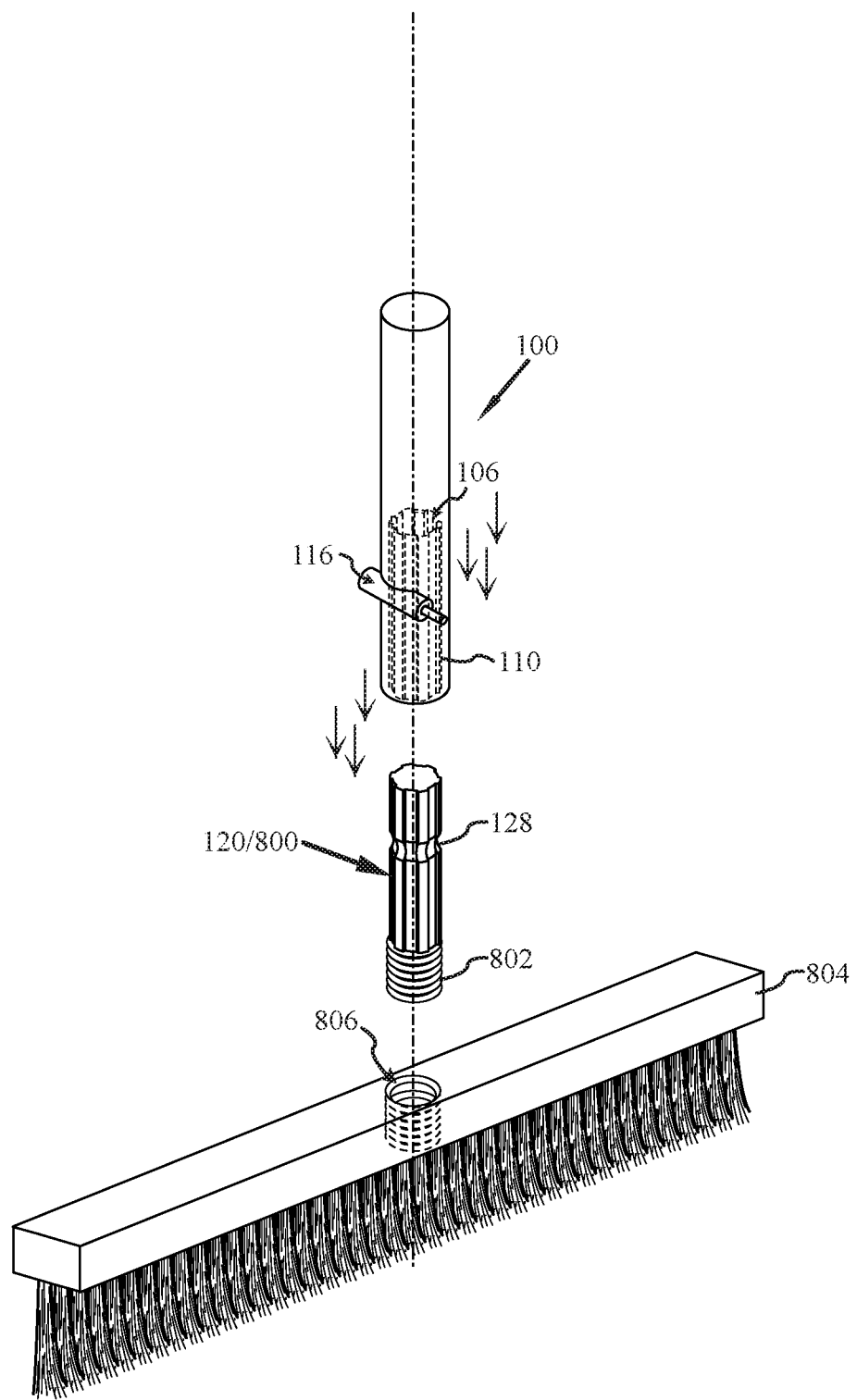
FIG. 8 is a perspective view of an optional embodiment providing a screw head adapter on the work head adapter for connection with a broom in accordance with embodiments of the present invention.

As is shown in FIG. 8, for at least one optional embodiment, the work head 120/800 may provide a traditional screw head 802 such that hand tool 100 may advantageously be used with traditional broom elements 804, mops, squeegees, or other common screw engaged work heads, providing a screw socket 806. It is to be specifically understood and appreciated that the screw head 802 does not fasten the work head 120/800 to the handle 102, but rather permits the assembled hand tool 100 to be used with pre-existing screw engaged work heads, providing a screw socket 806.

Figure 9:
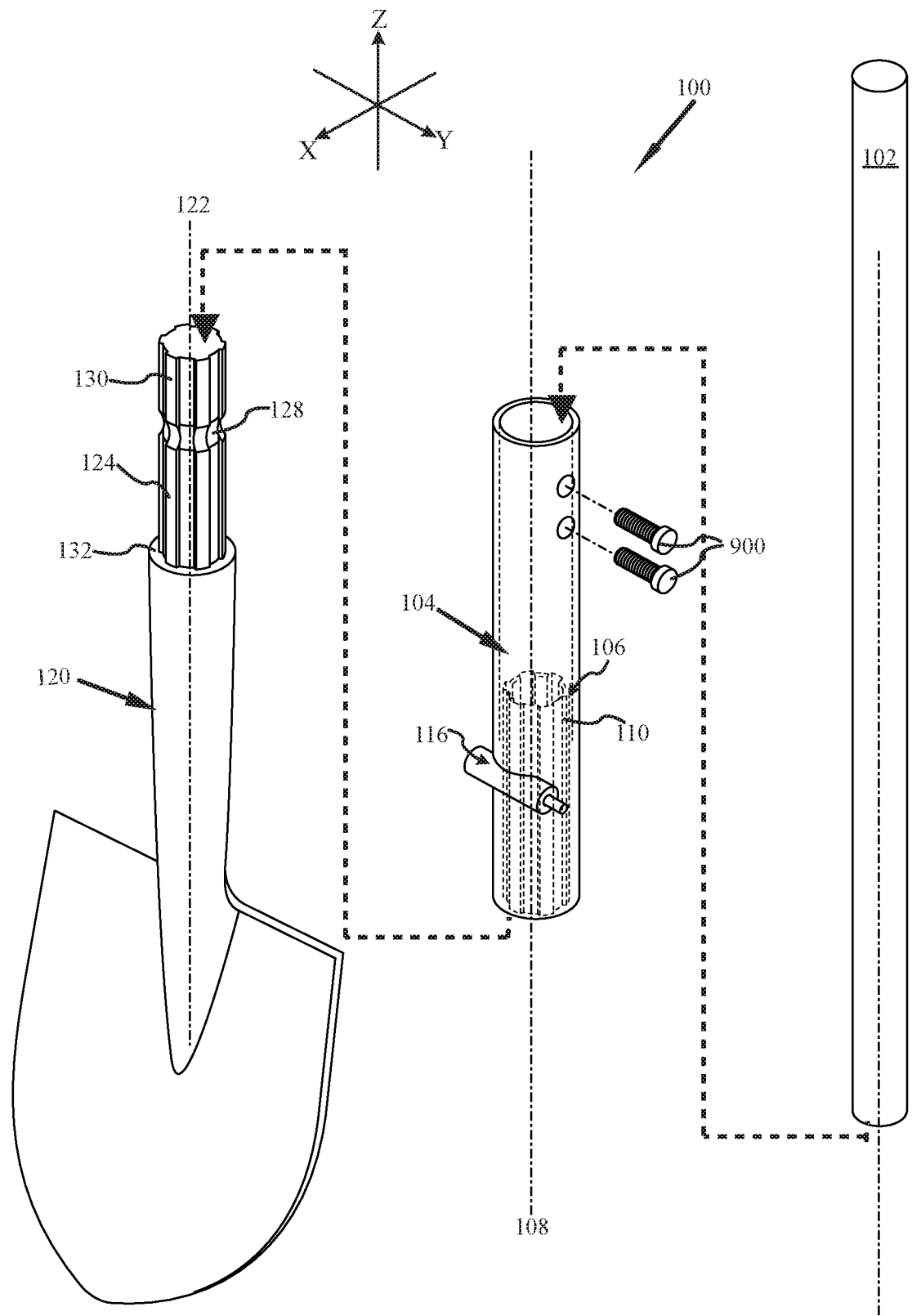
FIG. 9 is a perspective view similar to FIG. 1 showing a hand tool having a handle with a separate head receiver with quick release and a work head in accordance with embodiments of the present invention.

As noted above, in yet still other embodiments, such as the embodiment shown in FIG. 9, the socket 106, e.g., work head receiver 104, is a distinct component that may itself be removably attached to a handle 102, such as by bolts 900 or other semi-permanent attaching means. As such, if the handle 102 is damaged, bent or broken it may be replaced to restore full functionality of the hand tool 100 as desired.

In various embodiments, the work head 120 and specifically the shaft 124 are made of metal and welded, forged, cast or otherwise inseparably joined. Likewise, in varying embodiments, the socket 106 and handle 102 are made of metal and welded, forged, cast or otherwise inseparably joined. In at least one embodiment the shaft 124 and socket 106 are made of metal selected from the group consisting of, but not limited to, tungsten steel, stainless steel, aluminum, and pig iron.

In yet other embodiments it should be understood and appreciated that the although the socket 106 is formed from metal, the handle may be formed of a non-metal material, such as but not limited to wood, fiberglass, polycarbonate, carbon fiber or other material. In some embodiments, the metal socket 106 may be glued bonded or otherwise permanently affixed to the handle 102. And for yet still other embodiments, the shaft 124 and socket 106 are made of wood, fiberglass, polycarbonate, carbon fiber or other non-metal material. Moreover, although metal and composite materials may provide advantageous embodiments of the hand tool 100 for some embodiments, it will be understood and appreciated that various materials, and/or combinations of materials, may be desired for specific instances of use without departing from the scope of the present invention.

As set forth and described herein and in the accompanying drawings, it will be understood and appreciated that as one handle 102 may be used with a plurality of different work heads 120 and vis-a-versa. As such, for at least one embodiment, the present invention may be summarized as a hand tool 100 for use with quick release interchangeable work heads 120, including: a work head receiver 104 structured and arranged for attachment to a handle 102, the work head receiver 104 having a first longitudinal axis 108 and an inner cavity 110 extending rearward from an open distal end 112, the inner cavity 110 having a first polygonal cross section 114 transverse to the longitudinal axis 108, the work head receiver 104 further having a quick release 116 transverse to the first longitudinal axis 108, the quick release 116 releasably disposing a locker 118 transversely across a portion of the inner cavity 110; and wherein the handle 102 is structured and arranged to receive at least one work head 120 having a second longitudinal axis 122 and a shaft 124 having a second polygonal cross section 126 concentrically conforming to the first polygonal cross 108 section of the inner cavity 110, the shaft 124 further having a locking groove 128 transverse to the second longitudinal axis 122 and disposed to engage with the quick release locker 118 when the shaft 122 is disposed within the cavity 110 of the work head receiver 104.

For at least one alternative, embodiment, the present invention may be summarized as at least one hand tool interchangeable work 120 head for use with a with quick release handle 102, including: a work head 120 having a longitudinal axis 122 and a shaft 122 having a polygonal cross section 126, the shaft 122 further having a locking groove 128 transverse to the first longitudinal axis, the work head 120 structed and arranged to be received by a handle 102 having a work head receiver 104 having a socket 106 having a different longitudinal axis 108 and an inner cavity 110 extending rearward from an open distal end 112, the inner cavity 110 having a polygonal cross section 108 transverse to the different longitudinal axis 108 and concentrically conforming to the polygonal cross section 126 of the shaft 122, the socket 106 further having a quick release transverse 116 to the longitudinal axis 108, the quick release 116 releasably disposing a locker 118 transversely across a portion of the inner cavity 110; and wherein the locking groove 128 is structured and arranged to engage with a quick release locker 118 when the shaft 122 is disposed within the cavity 110 of the work head receiver 104.

Figure 10:
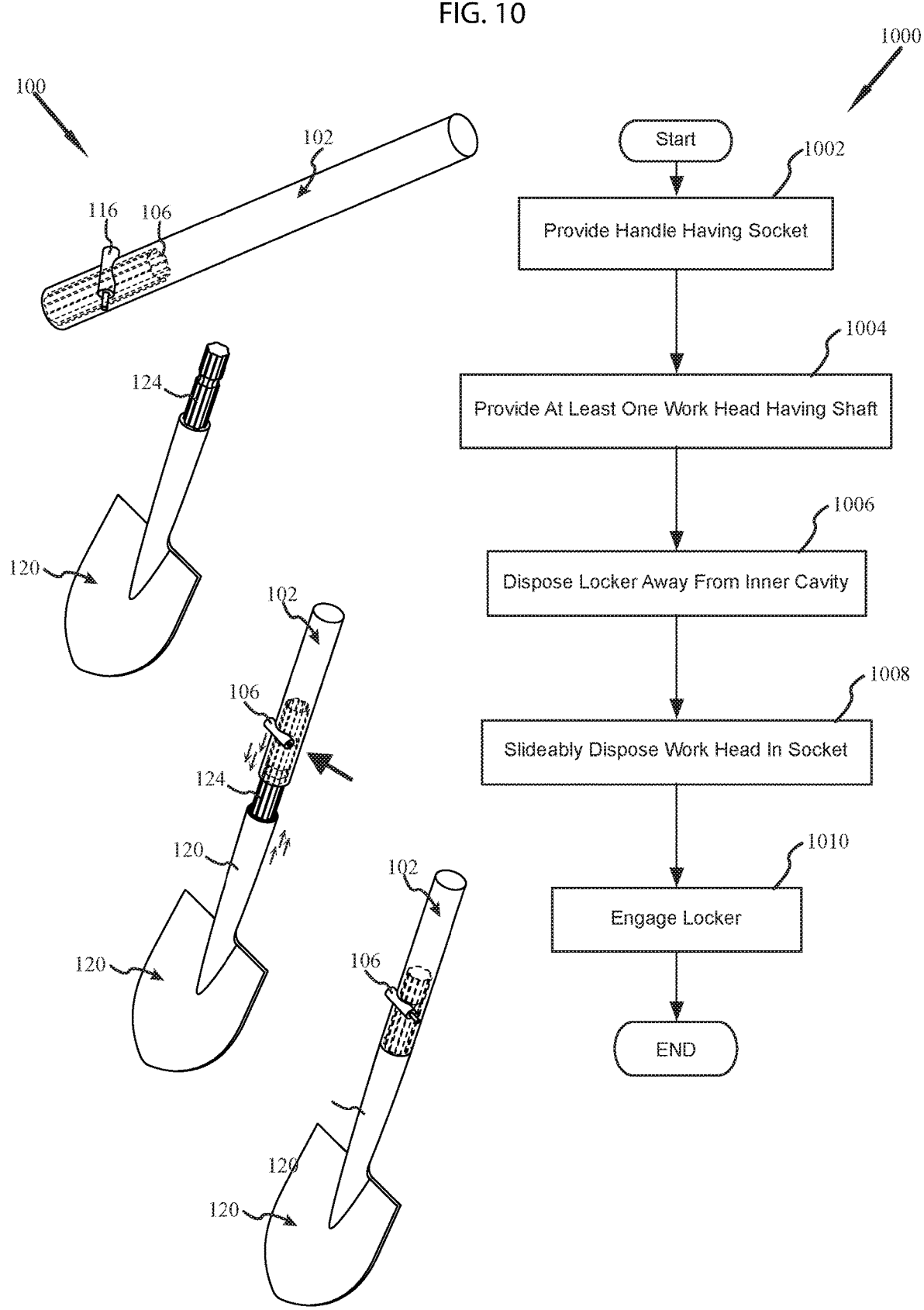
FIG. 10 presents a high level flow diagram for a method of providing a hand tool in accordance with embodiments of the present invention.

FIG. 10 in connection with FIGS. 1-9 provides a high level flow diagram for a method 1000 of providing a hand tool 100 in accordance with at least one embodiment of the present invention. It will be appreciated that the described method need not be performed in the order in which it is herein described, but that this description is merely exemplary of one method of providing a hand tool 100.

In general, method 1000 commences by providing a handle 102 having a socket 106, block 1002. As described above, for at least one embodiment, the handle 102 has a first longitudinal axis 108 and an inner cavity 110 extending rearward from an open distal end 112. The inner cavity 110 has a first non-circular cross section 114 transverse to the first longitudinal axis. The socket 102 also has a quick release 116 transverse to the first longitudinal axis 108, the quick release 116 releasably disposing a locker 118 transversely across a portion of the inner cavity 110.

Method 1000 continues with the providing of at least one work head 120, block 1004. As described above, the work head 120 has a second longitudinal axis 122 and a shaft 124 having a second non-circular cross section 126 concentrically conforming to the first non-circular cross section 114 of the inner cavity 110. The shaft 124 also has a locking groove 128 transverse to the second longitudinal axis 126 and disposed to engage with the quick release 116 locker 118 when the shaft 124 is disposed within the socket 106 of the handle 102.

For assembly of hand tool 100, method 1006 proceed with the user disposing the locker 120 away from the inner cavity 110, block 1006.

With the locker 118 of the quick release 116 disengaged, the user slideably disposes the shaft 124 of a selected work head 120 into the socket 124, block 1008.

The user completes the assembly by releasing the locker 118 into the inner cavity so as to engage with the locking groove 128 of the disposed work head 120, block 1010.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall there between.

What is claimed is:

1. A hand tool with quick release interchangeable work heads, comprising:
   a handle having a socket having a first longitudinal axis and an inner cavity extending rearward from an open distal end, the inner cavity having a first non-circular cross section transverse to the first longitudinal axis, the socket further having a quick release transverse to the first longitudinal axis, the quick release releasably disposing a locker transversely across a portion of the inner cavity; and
   at least one work head having a second longitudinal axis and a shaft having a second non-circular cross section concentrically conforming to the first non-circular cross section of the inner cavity, the shaft further having a locking groove transverse to the second longitudinal axis and disposed to engage with the quick release locker when the shaft is disposed within the socket of the handle, the first non-circular cross section and the second non-circular cross section preventing rotation of the at least one work head relative to the handle when the work head shaft is engaged to the socket of the handle;
   the quick release locker further including:
      a locking pin having a first section having a first diameter consistent across a first length and a second section having a second diameter consistent along a second length, the second diameter smaller than the first diameter;
      the locking pin disposed within a sleeve with the first section of the locking pin against a first spring disposed against a first end of the sleeve, at least a portion of the second section disposed through a securing cap affixed to a second end of the sleeve opposite from the first end, a second spring disposed within the sleeve and about a portion of the second section and disposed against the securing cap;
      wherein in a first state with the first spring and second spring extended against the locking pin, the first section is aligned to a longitudinal aperture in the sleeve opening transversely to the inner cavity such that a longitudinal portion of the first section of the locking pin is disposed within the inner cavity as the locker; and
      wherein in a second state with the first spring compressed by the locking pin laterally moved towards the first end, the first section of the locking pin is displaced from the inner cavity.

2. The hand tool of claim 1, wherein the mating of the first non-circular cross section and the second non-circular cross section prevents longitudinal rotation of a work head relative to the handle when the shaft is disposed within the socket.

3. The hand tool of claim 1, wherein the shaft is a spline shaft and the socket is a corresponding spline shaft socket.

4. The hand tool of claim 3, wherein the spline shaft is a 6 splined shaft.

5. The hand tool of claim 3, wherein the spline shaft is an 8 splined shaft.

6. The hand tool of claim 3, wherein the spline shaft has between 2 and 36 splines.

7. The hand tool of claim 1, wherein the second non-circular cross section of the shaft is a regular polygon.

8. The hand tool of claim 1, wherein the work head is selected from the group consisting of a shovel, a spade, a hoe, a rake, a pitch fork, a digging spike, a threaded attacher, a sledge hammer, an axe, a pick.

9. The hand tool of claim 1, wherein the socket and the shaft are made from metal.

10. The hand tool of claim 9, wherein the socket and the shaft are made from tungsten steel.

11. The hand tool of claim 1, wherein the locking groove is circumferential about the shaft, the shaft having a plurality of alignments to the socket.

12. The hand tool of claim 1, wherein an assembled hand tool provided by a work head shaft engaged in the socket of the handle is impact resistant.

13. The hand tool of claim 1, wherein the work head and handle provide a class-three lever.

14. A hand tool with quick release interchangeable work heads, comprising:
   a work head receiver as a component of a handle, the work head receiver having a first longitudinal axis and an inner cavity extending rearward from an open distal end, the inner cavity structured and arranged as a spline shaft socket, the work head receiver further having a quick release transverse to the first longitudinal axis, the quick release releasably disposing a locker transversely across a portion of the inner cavity; and
   at least one work head having a second longitudinal axis and a spline shaft concentrically conforming to the spline shaft socket of the work head receiver, the spline shaft further having a locking groove transverse to the second longitudinal axis and disposed to engage with the quick release locker when the shaft is disposed within the work head receiver, the spline shaft socket and the spline shaft preventing rotation of the at least one work head relative to the handle when the work head shaft is engaged to the socket of the handle;
   the quick release locker further including:
      a locking pin having a first section having a first diameter consistent across a first length and a second section having a second diameter consistent along a second length, the second diameter smaller than the first diameter;
      the locking pin disposed within a sleeve with the first section of the locking pin against a first spring disposed against a first end of the sleeve, at least a portion of the second section disposed through a securing cap affixed to a second end of the sleeve opposite from the first end, a second spring disposed within the sleeve and about a portion of the second section and disposed against the securing cap;
      wherein in a first state with the first spring and second spring extended against the locking pin, the first section is aligned to a longitudinal aperture in the sleeve opening transversely to the inner cavity such that a longitudinal portion of the first section of the locking pin is disposed within the inner cavity as the locker; and
      wherein in a second state with the first spring compressed by the locking pin laterally moved towards the first end, the first section of the locking pin is displaced from the inner cavity.

15. The hand tool of claim 14, wherein the work head receiver is attached to a straight handle as may be appropriate for a digging hand tool.

16. The hand tool of claim 14, wherein the work head receiver is attached to the handle by at least one transverse attacher.

17. The hand tool of claim 14, wherein the spline shaft has between 2 and 36 splines.

18. The hand tool of claim 17, wherein the spline shaft is a 6 splined shaft.

19. The hand tool of claim 17, wherein the spline shaft is an 8 splined shaft.

20. The hand tool of claim 14, wherein the work head is selected from the group consisting of a shovel, a spade, a hoe, a rake, a pitch fork, a digging spike, a threaded attacher, a sledge hammer, an axe, a pick.

21. The hand tool of claim 14, wherein the socket and the shaft are made from metal.

22. The hand tool of claim 14, wherein an assembled hand tool provided by a work head spline shaft engaged in the spline shaft socket of the work head receiver is impact resistant.

23. The hand tool of claim 14, wherein the work head and handle provide a class-three lever.

24. A hand tool for use with quick release interchangeable work heads, comprising:
   a work head receiver structured and arranged for attachment to a handle, the work head receiver having a first longitudinal axis and an inner cavity extending rearward from an open distal end, the work head receiver having a first polygonal cross section transverse to the longitudinal axis, the inner cavity further having a quick release transverse to the first longitudinal axis, the quick release releasably disposing a locker transversely across a portion of the inner cavity; and
   wherein the handle is structured and arranged to receive at least one work head having a second longitudinal axis and a shaft having a second polygonal cross section concentrically conforming to the first polygonal cross section of the inner cavity, the shaft further having a locking groove transverse to the second longitudinal axis and disposed to engage with the quick release locker when the shaft is disposed within the socket of the work head receiver, the first polygonal cross section and the second polygonal cross section preventing rotation of the at least one work head relative to the handle when the work head shaft is engaged to the work head receiver of the handle;
   the quick release locker further including:
      a locking pin having a first section having a first diameter consistent across a first length and a second section having a second diameter consistent along a second length, the second diameter smaller than the first diameter;
      the locking pin disposed within a sleeve with the first section of the locking pin against a first spring disposed against a first end of the sleeve, at least a portion of the second section disposed through a securing cap affixed to a second end of the sleeve opposite from the first end, a second spring disposed within the sleeve and about a portion of the second section and disposed against the securing cap;
      wherein in a first state with the first spring and second spring extended against the locking pin, the first section is aligned to a longitudinal aperture in the sleeve opening transversely to the inner cavity such that a longitudinal portion of the first section of the locking pin is disposed within the inner cavity as the locker; and
      wherein in a second state with the first spring compressed by the locking pin laterally moved towards the first end, the first section of the locking pin is displaced from the inner cavity.

25. The hand tool of claim 24, wherein the shaft is a spline shaft, the first polygonal cross section being a negative of the spline shaft and the second polygonal cross section being a positive of the spline shaft.

26. The hand tool of claim 25, wherein the spline shaft has between 2 and 36 splines.

27. The hand tool of claim 24, wherein the work head and handle provide a class-three lever.

28. The hand tool of claim 24, wherein the work head is selected from the group consisting of a shovel, a spade, a hoe, a rake, a pitch fork, a digging spike, a threaded attacher, a sledge hammer, an axe, a pick.

29. A hand tool interchangeable work head for use with a quick release receiver, comprising:
   a work head having a first longitudinal axis and a shaft having a first polygonal cross section, the shaft further having a locking groove transverse to the first longitudinal axis, the work head structed and arranged to be received by a handle having a socket having a second longitudinal axis and an inner cavity extending rearward from an open distal end, the inner cavity having a second polygonal cross section transverse to the second longitudinal axis and concentrically conforming to the first polygonal cross section of the shaft, the socket further having a quick release transverse to the first longitudinal axis, the quick release releasably disposing a locker transversely across a portion of the inner cavity, the first polygonal cross section and the second polygonal cross section preventing rotation of the at least one work head relative to the handle when the work head shaft is engaged to the socket of the handle; and
   wherein the locking groove is structured and arranged to engage with a quick release locker when the shaft is disposed within the socket of the handle;
   the quick release locker further including:
      a locking pin having a first section having a first diameter consistent across a first length and a second section having a second diameter consistent along a second length, the second diameter smaller than the first diameter;
      the locking pin disposed within a sleeve with the first section of the locking pin against a first spring disposed against a first end of the sleeve, at least a portion of the second section disposed through a securing cap affixed to a second end of the sleeve opposite from the first end, a second spring disposed within the sleeve and about a portion of the second section and disposed against the securing cap;
      wherein in a first state with the first spring and second spring extended against the locking pin, the first section is aligned to a longitudinal aperture in the sleeve opening transversely to the inner cavity such that a longitudinal portion of the first section of the locking pin is disposed within the inner cavity as the locker; and
      wherein in a second state with the first spring compressed by the locking pin laterally moved towards the first end, the first section of the locking pin is displaced from the inner cavity.

30. The hand tool of claim 29, wherein the shaft is a spline shaft.

31. The hand tool of claim 30, wherein the spline shaft has between 2 and 36 splines.

32. The hand tool of claim 29, wherein the work head is selected from the group consisting of a shovel, a spade, a hoe, a rake, a pitch fork, a digging spike, a threaded attacher, a sledge hammer, an axe, a pick.

33. The hand tool of claim 29, wherein the work head and handle provide a class-three lever.

34. A hand tool with quick release interchangeable work heads, comprising:
- a handle having a socket having a first longitudinal axis and an inner cavity extending rearward from an open distal end, the inner cavity having a first non-circular cross section transverse to the first longitudinal axis, the socket further having a quick release transverse to the first longitudinal axis, the quick release releasably disposing a locker transversely across a portion of the inner cavity; and
- at least one work head having a second longitudinal axis and a shaft having a second non-circular cross section concentrically conforming to the first non-circular cross section of the inner cavity, the shaft further having a locking groove transverse to the second longitudinal axis and disposed to engage with the quick release locker when the shaft is disposed within the socket of the handle, the first non-circular cross section and the second non-circular cross section preventing rotation of the at least one work head relative to the handle when the work head shaft is engaged to the socket of the handle;
- the work head selected from the group consisting of: a shovel, a spade, a hoe, a rake, a pitch fork, a digging spike, a threaded attacher, a sledge hammer, an axe, a pick;
- the quick release locker further including:
  - a locking pin having a first section having a first diameter consistent across a first length and a second section having a second diameter consistent along a second length, the second diameter smaller than the first diameter;
  - the locking pin disposed within a sleeve with the first section of the locking pin against a first spring disposed against a first end of the sleeve, at least a portion of the second section disposed through a securing cap affixed to a second end of the sleeve opposite from the first end, a second spring disposed within the sleeve and about a portion of the second section and disposed against the securing cap;
  - wherein in a first state with the first spring and second spring extended against the locking pin, the first section is aligned to a longitudinal aperture in the sleeve opening transversely to the inner cavity such that a longitudinal portion of the first section of the locking pin is disposed within the inner cavity as the locker; and
  - wherein in a second state with the first spring compressed by the locking pin laterally moved towards the first end, the first section of the locking pin is displaced from the inner cavity.

35. The hand tool of claim 34, wherein the work head and handle provide a class-three lever.

* * * * *